(12) United States Patent
Kālāntār

(10) Patent No.: US 6,848,799 B2
(45) Date of Patent: Feb. 1, 2005

(54) OPTICAL LIGHT GUIDE MEMBER, ILLUMINATION UNIT, AND INSTRUMENT

(75) Inventor: Kalil Kālāntār, Hachioji (JP)

(73) Assignee: Nippon Leiz Corporation, Tokyo (JP)

( * ) Notice: Subject to any disclaimer, the term of this patent is extended or adjusted under 35 U.S.C. 154(b) by 46 days.

(21) Appl. No.: 10/244,639

(22) Filed: Sep. 16, 2002

(65) Prior Publication Data

US 2003/0128957 A1 Jul. 10, 2003

(30) Foreign Application Priority Data

Jan. 10, 2002 (JP) ........................................ 2002-003928
Jul. 19, 2002 (JP) ........................................ 2002-211058

(51) Int. Cl.⁷ .............................................. G01D 11/28
(52) U.S. Cl. .............................. 362/23; 362/26; 362/27
(58) Field of Search .............................. 362/23, 26, 27, 362/31; 116/286, 287, 310, DIG. 5, DIG. 36

(56) References Cited

U.S. PATENT DOCUMENTS

| | | | |
|---|---|---|---|
| 5,971,558 A | * 10/1999 | Peel .............................. | 362/26 |
| 6,065,846 A | * 5/2000 | Kato et al. ..................... | 362/23 |
| 6,183,099 B1 | * 2/2001 | Garay et al. ................... | 362/26 |
| 6,356,394 B1 | * 3/2002 | Glienicke ..................... | 362/26 |

FOREIGN PATENT DOCUMENTS

| | | |
|---|---|---|
| EP | 0 732 679 A1 | 9/1996 |
| JP | Sho. 54-147248 | 11/1979 |
| JP | 62-76617 | 5/1987 |
| JP | 06300765 | 10/1994 |
| JP | 08099563 | 4/1996 |
| JP | 09287981 | 11/1997 |
| JP | 11115552 | 4/1999 |
| JP | 2000213964 | 8/2000 |
| JP | 2001067029 | 3/2001 |
| JP | 2001304920 | 10/2001 |
| WO | WO 98/26212 | 6/1998 |

* cited by examiner

*Primary Examiner*—Y My Quach Lee
(74) *Attorney, Agent, or Firm*—Workman Nydegger

(57) ABSTRACT

An optical light guide member according to the present invention includes a tubular portion in which an annular light incident end surface for entering light is formed on a one end thereof, a funnel-shaped expanded section having a one end side thereof continuously extending to the other end of the tubular portion, a flat section which has on a front side thereof a light exit surface extending along a flat plane intersecting an axis of the tubular portion, and which extends continuously to the one end side of the funnel-shaped expanded section, and a plurality of light deflection elements formed at least on the back side of the flat section each for altering the traveling direction of the light. An incident light on the tubular portion from the light incident end surface is emitted with a uniform intensity distribution from the light exit end surface.

19 Claims, 8 Drawing Sheets

OPTICAL LIGHT GUIDE MEMBER, ILLUMINATION UNIT, AND INSTRUMENT

This application is based on Japanese Patent Application Nos. 2002-003928 filed Jan. 10, 2002 and 2002-211058 filed Jul. 19, 2002, the contents of which are incorporated hereinto by reference.

BACKGROUND OF THE INVENTION

1. Field of the Invention

The present invention relates to an optical light guide member for guiding incident light from an annular light incident end surface formed at one end of a tubular portion such that the light is emitted from a light exit surface extending along a flat surface intersecting an axis of the tubular portion, and to an illumination unit and an instrument in which the foregoing optical light guide member is assembled.

2. Description of the Related Art

For illumination for an instrument in a speedometer of an automobile in prior art techniques a light source is provided on an outer circumference of an indicator section to illuminate the indicator section or a light source is provided on the backside of the indicator section having a transparent portion through which light transmits to achieve transmission illumination for the indicator section. In these prior art techniques use is however made of a light bulb as the light source.

A light bulb for use in illumination for an instrument equipped in an automobile has a problem in durability against vibration and so on, followed by relatively much consumption of electric power and by difficult exchange of any light bulb when it burned out.

For illumination of the type where light from a light bulb is directly applied to the surface of the indicator illumination efficiency is deteriorated to the utmost at locations far away from the light bulb even if the configuration of a reflector is designed variously, so that it is necessary to arrange a plurality of light bulbs along an outer circumference of the indicator, to result in such inconvenience that the consumption of electric power for illuminating the indicator is increased.

Although in the type of the transmission illumination as described above such inconvenience is moderated, in order to uniformize the light transmitted through the indicator it is necessary to increase a distance from the indicator to the light source, obstructing the instrument to be made compact.

SUMMARY OF THE INVENTION

It is therefore an object of the present invention to provide a compact instrument capable of uniform transmission illumination over the whole of an indicator.

Another object of the present invention is to provide an optical light guide member capable of realization of such an instrument, and an illumination unit in which the foregoing optical light guide member is assembled.

A first aspect of the present invention is an optical light guide member comprising a tubular portion in which an annular light incident end surface for entering light is formed on the side of a one end thereof, a funnel-shaped expanded section which has a one end side thereof continuously extending to the other end of the tubular portion, a flat Section which includes on a front side thereof a light exit surface extending along a flat plane intersecting an axis of the tubular portion for emitting light, and which extends continuously to the one end side of the funnel-shaped expanded section, and a plurality of light deflection elements formed at least on the back side of the flat section each for altering the traveling direction of the light.

In the present invention, when light from the annular light incident end surface formed on the side of the one end of the tubular portion is incident on the tubular portion, the light is guided to the flat section through the funnel-shaped expanded section from the tubular portion at the angle of total reflection depending upon the refractive index of the optical light guide member, and is emitted from the light exit end surface through a light deflection element formed on the back of the optical light guide member.

In accordance with the optical light guide member of the present invention, an incident light on the tubular portion from the annular light incident end surface is guided to a flat section from the funnel-shaped expanded section, and is emitted from a light exit surface.

In the optical light guide member according to the first aspect of the present invention, the light incident end surface may be constructed with part of a circular cone or a spherical surface having a center side thereof being concave. Thus, the incident light from the light incident end surface is refracted toward the funnel-shaped expanded section to reduce light leaking to the outside if the optical light guide member from the tubular portion, and hence the light is effectively emitted from the light exit surface of the flat section.

A first light deflection section may be further formed on at least one of an outer circumferential surface of the tubular portion and the light incident end surface. The first light deflection section formed on the outer circumferential surface of the tubular portion may include plural pairs of prism faces each having an edge extending longitudinally of the tubular portion. The first light deflection section formed on the incident end surface may include plural pairs of prism faces each having an edge radially extending from the center of the light incident end surface. In the above cases, It is possible to more uniformize a circumferential light energy distribution of light being incident on the tubular portion from the light incident end surface and traveling therethrough.

The light deflection elements may be of a continuous annular configuration respectively and surround multiply the axis of the tubular portion, and an interval between the light deflection elements may be more narrowed as a distance from the axis of the tubular portion radially increases. In this case, it is possible to uniformize the distribution of energy of light exiting from the light exit surface of the flat section over the whole area of the light exit surface.

A second light deflection section may be formed on an inner circumferential surface of the tubular portion. The second light deflection section formed may have an uneven surface, the thickness of which continuously may change circumferentially of the tubular portion. In this case, it is possible to uniformize the energy distribution of the light being incident on the tubular portion from the light incident end surface and traveling the same circumferentially of the tubular portion.

The thickness of the flat section may be gradually reduced toward the side of the outer circumferential end such that the light is effectively emitted from the light exit surface of the flat section.

A second aspect of the present invention is an illumination unit comprising the optical light guide member according to the first aspect of the present invention, a light source disposed oppositely to the light incident end surface of the tubular portion of the optical light guide member for emitting a light as illumination light that is incident on the optical light guide member from the light incident end surface, and a light reflection member for covering the optical light guide member except the light incident end surface and the light exit surface so as to reflect light leaking out of the optical light guide member except the light incident end surface and the light exit surface.

In accordance with the illumination unit of the present invention, the incident light on the tubular portion from the annular light incident end surface is effectively emitted from the light exit surface of the flat section.

In the illumination unit according to the second aspect of the present invention, a light diffusion member may be disposed oppositely to the light exit surface of the optical light guide member for diffusing the light emitted from the light exit surface. In this case, it is possible to more uniformize the intensity and luminance distributions of light emitted from the light exit surface.

The optical light guide member or the light diffusion member may be colored such that a tone of color of the light emitted from the light exit surface is freely adjusted without influencing a tone of color of the light source.

The light source may include a plurality of LEDs disposed at an equal interval. In this case, it is possible to make the illumination unit more compact, and reduce consumed electric power to the minimum.

A third aspect of the present invention is an instrument comprising the illumination unit according to the second aspect of the present invention, a rotary shaft which penetrates the tubular portion of the optical light guide member and to which the number of revolutions is provided from the base end in response to an input, and an index mounted on a tip end of the rotary shaft.

In accordance with the instrument of the present invention, the incident light on the tubular portion from the annular light incident end surface can be effectively emitted from the light exit surface of the flat section, and the visibility for the indicator can be kept excellent with the aid of the transmission illumination.

In the instrument according to the third aspect of the present invention, there may be additionally provided a casing for accommodating the illumination unit such that the illumination unit is protected without fail, and that the treatment thereof is achieved with ease. Particularly, the casing may be the light reflection member of the illumination unit such that the instrument can be made compact.

The optical light guide member or the indicating section may be the light diffusion member of the illumination unit. In this case, it is possible not only to uniformize the intensity and luminance distributions of the light emitted from the light exit surface but also to make the instrument compact.

BRIEF DESCRIPTION OF THE DRAWINGS

The above and other objects, advantages and features of the present invention will be more apparent from the following description taken in conjunction with the accompanying drawings in which.

DETAILED DESCRIPTION OF PREFERRED EMBODIMENTS

In what follows, there will be described in detail preferred embodiments of the present invention in which an instrument according to the present invention is applied to a speedometer (tachometer) of an automobile and the like with reference to FIGS. 1 to 8. The present invention is however not limited to those preferred embodiments, but it may be further applied to combinations of those embodiments with all alterations and corrections included in the idea of the present invention as claimed in the claims in the present specification. The present invention is therefore applicable to other arbitrary techniques belonging to the spirit of the present invention.

Figure 1:
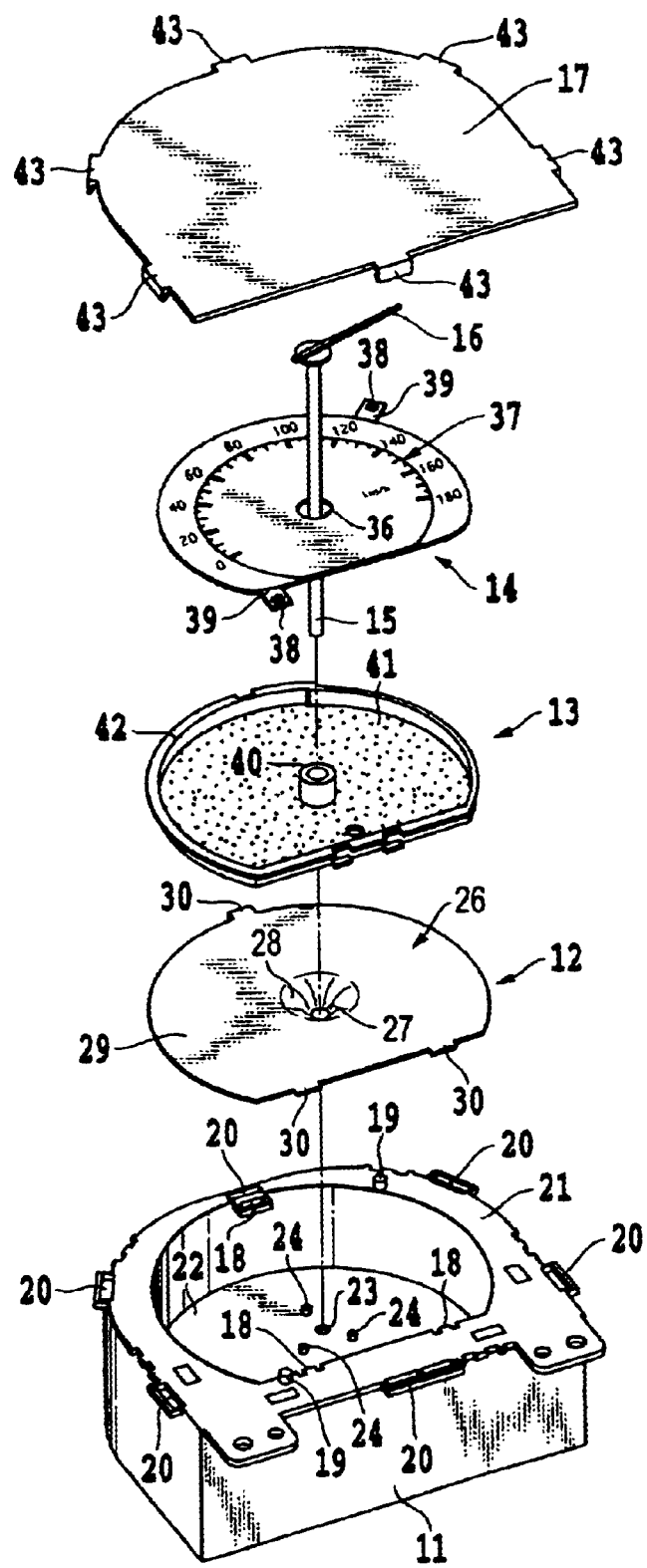
FIG. 1 is a decomposed perspective view illustrating an external appearance of a main section of an embodiment in which an instrument according to the present invention is applied to a speedometer.
Figure 2:
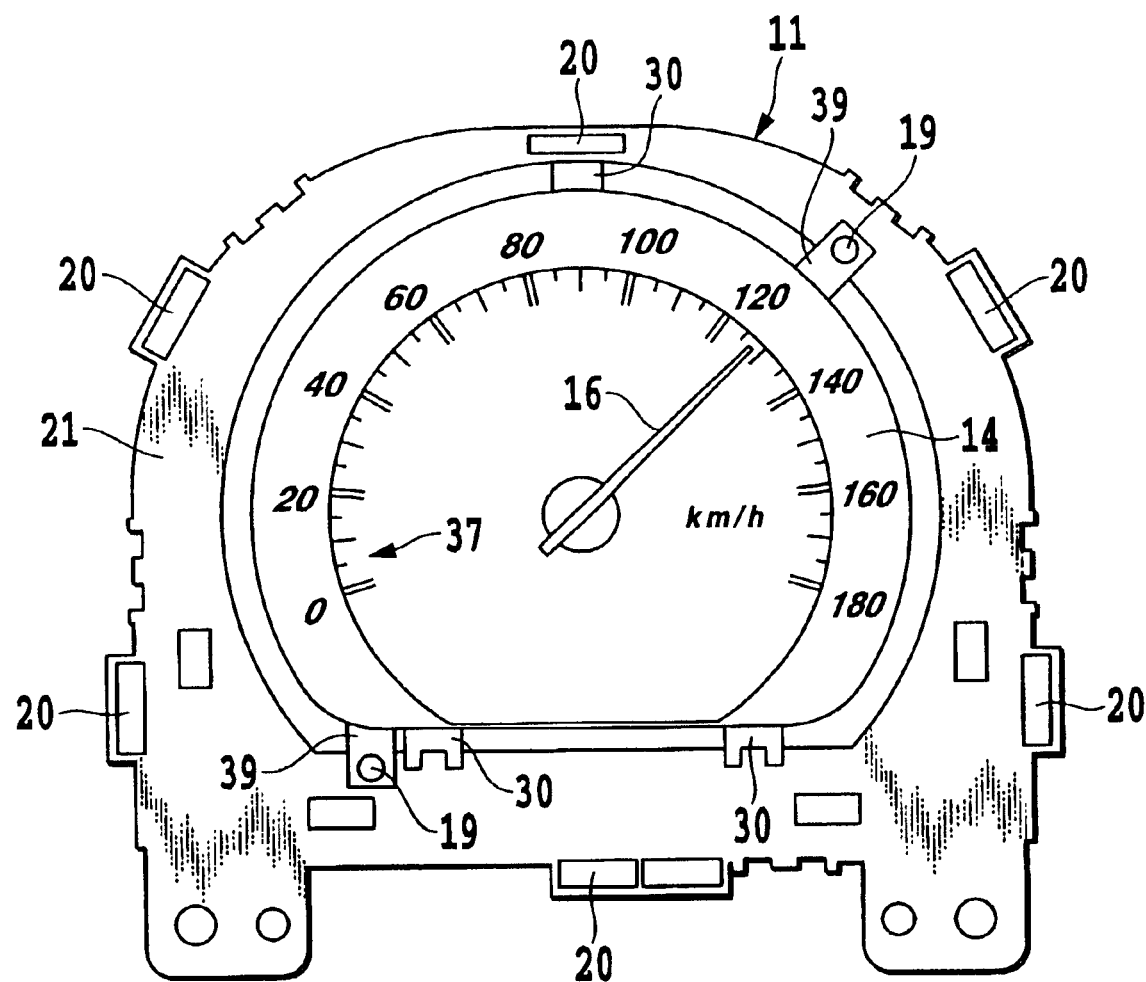
FIG. 2 is a front view illustrating a state where a cover in the embodiment illustrated in FIG. 1 is removed.

Referring now to FIG. 1, there is illustrated a decomposed state of a main section of a speedometer in the present embodiment, and referring further to FIG. 2 there is illustrated in a frontal view a configuration of the main section in the state thereof where a cover is removed. In the speedometer in the present embodiment, the main section comprises a cup shaped casing 11, a transparent optical light guide member 12 accommodated in the casing 11, an optical diffusion plate 13 placed, overlapped on the optical light guide member 12, an indicating plate 14 placed on the optical diffusion plate 13, a rotary shaft 15 that penetrates the casing 11, optical light guide member, optical diffusion plate 13, and indicating plate 14, with a base end side thereof supported rotatably with respect to the casing 11, an index 16 fixed integrally to a tip end of the rotary shaft 15, and a transparent cover 17 overlapped on the casing 11 from an upper portion of the index 16 and the indicating plate 14.

In the casing 11, to an inner wall of which white color painting and aluminum deposition are applied, there is formed a flange section 21 that includes a plurality of (3 in the embodiment in FIGS. 1 and 2) stopper sections 18 for fixing the optical light guide member 12, a pair of stopper pins 19 for fixing the indicating plate 14, and a plurality of (6 in the embodiment in FIGS. 1 and 2) stopper holes 20 for fixing the cover 17. In the casing 11 there is accommodated a printed circuit board 22 for receiving electric power from the outside through a connection terminal (not shown). Around a rotary shaft through-hole 23 formed in the printed circuit board 22 there are mounted a plurality of (3 in the embodiment in FIGS. 1 and 2) LEDs 24 at an equal distance, which are a light source for rendering the indicating plate 14 to transmission illumination. Light emitted from these LEDs 24 may be an arbitrary hue without limitation to white. It is also possible to employ the LEDs 24 having mutually different hues. In this case, preferably, light beams emitted from LEDs 24 having mutually different hues are uniformly mixed so that light having a single hue is emitted from the optical diffusion plate 13 and so that the intensity and luminance distributions of the light beams are uniformed.

The use of such LEDs 24 as the light source can suppress consumed electric power to the minimum.

In the present embodiment, there is formed a relatively large gap between the casing 11 that serves as an optical reflection member in accordance with the present invention and the optical light guide member 12. It might be therefore also effective to assemble into the gap an independent optical reflection member that covers portions of the optical light guide member 12 except an optical incident end surface 25 and the optical exit surface 26 described later, and reflects light beams leaking from the portions of the optical light guide member 12 except the optical incident end surface 25 and the optical exit surface 26 again to the side of the optical light guide member 12. It is herein also possible to form the optical reflection member into a funnel shape while being fitted to the configuration of the optical light guide member 12. Therefore, the leaking lights are less attenuated, and are returned to the side of the optical light guide member 12.

Figure 3:
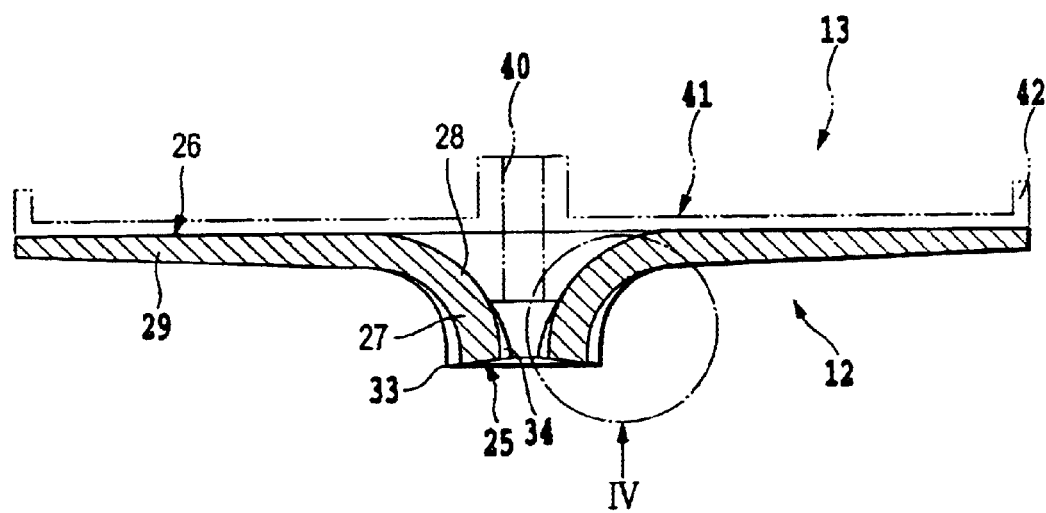
FIG. 3 is a cross sectional view of an optical light guide member in the embodiment illustrated in FIG. 1.
Figure 4:
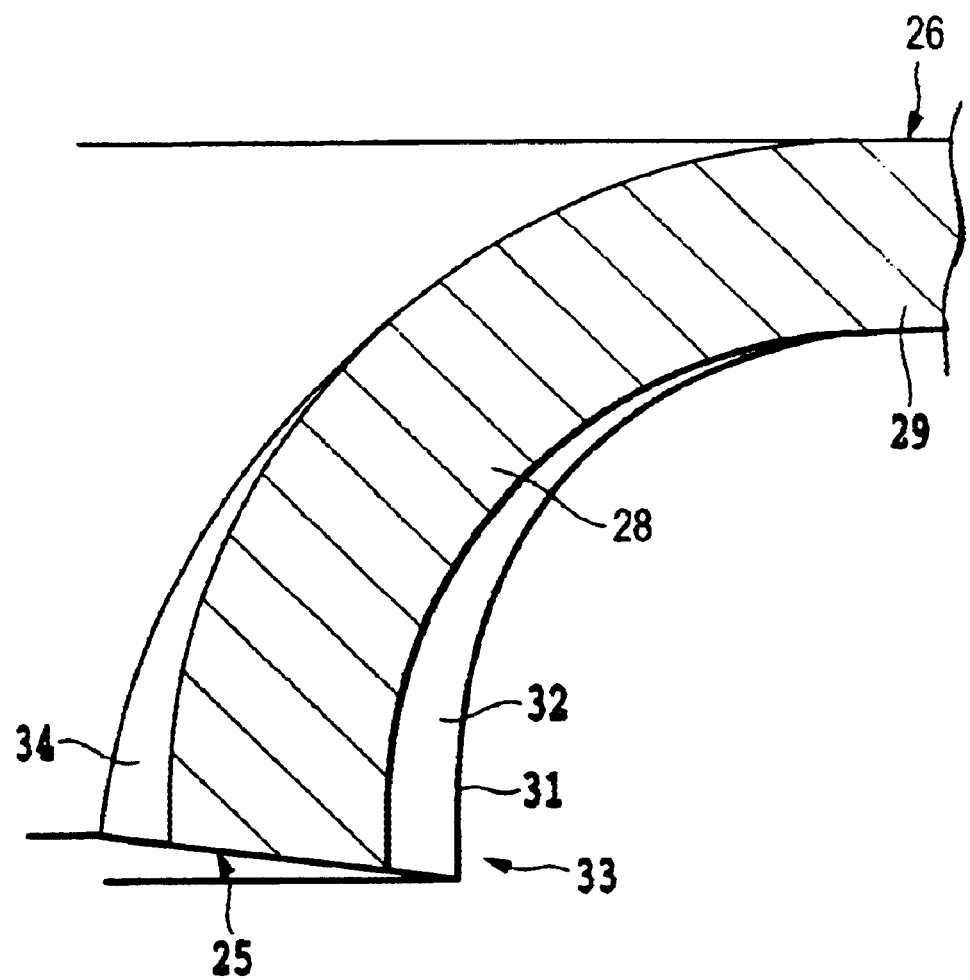
FIG. 4 is an extracted and enlarged view of a section indicated by an arrow IV in FIG. 3.
Figure 5:
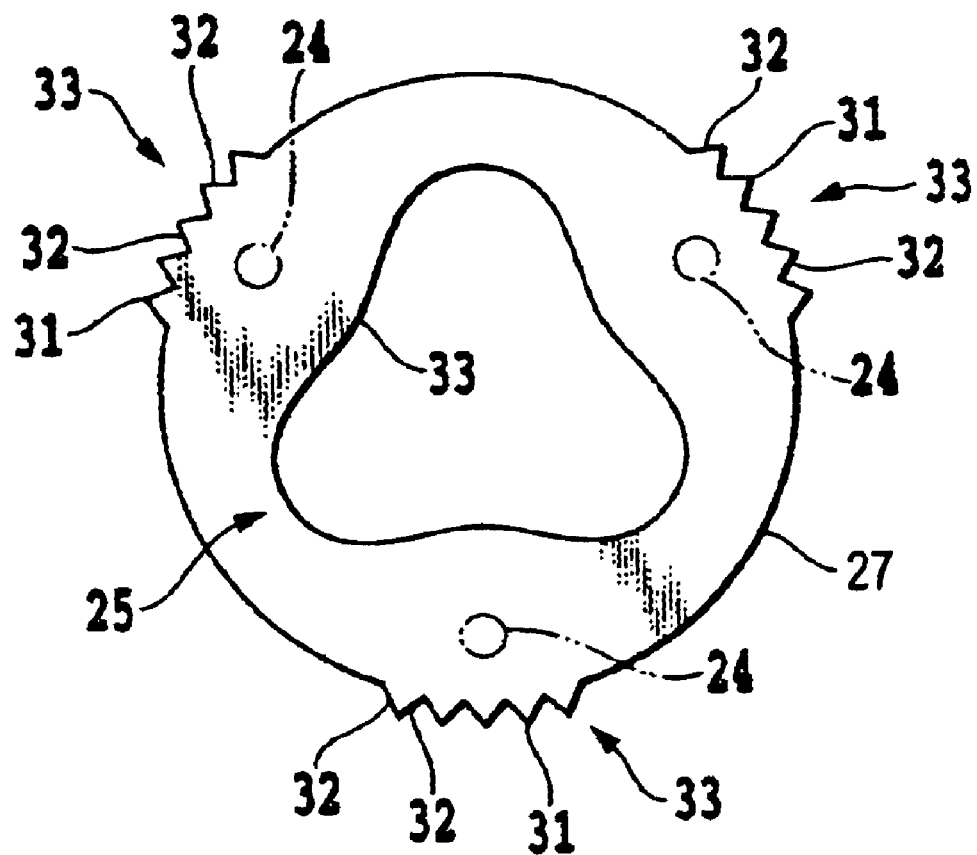
FIG. 5 is an enlarged front view illustrating a light incident end surface of the optical light guide member illustrated in FIG. 3.

Referring to FIG. 3, the optical light guide member 12 in the present embodiment is illustrated in a cross sectional view, and referring to FIG. 4 the optical light guide member 12 is further illustrated, extracted and enlarged in a portion thereof shown by an arrow IV in FIG. 3, and further referring to FIG. 5 the incident end surface 25 of the optical light guide member 12 in an enlarged front surface configuration. The optical light guide member 12 in the present embodiment includes a tubular portion 27 in which the annular light incident end surface 25 is formed on the side of a one end for entering light, a funnel-shaped expanded section 28 with a one end side extending continuously to the other end of the tubular portion 27, and a flat section 29 which includes on a front side thereof the light exit surface 26 extending along a flat plane intersecting an axis of the tubular portion 27 for emitting light and which extends continuously to the one end side of the funnel-shaped expanded section 28. The optical light guide member 12 can be molded with transparent acrylic resin, etc. The flat section 29 of the optical light guide member 12 has its thickness that gradually reduces toward the side of an outer circumferential end. The flat section 29 includes on an outer circumferential edge thereof a plurality of stopper protrusions 30 which can be engaged with a stopper section 18 provided on the flange 21 of the casing 11.

The light incident end surface 25 is formed with part of a circular cone or a spherical surface concaved at the center thereof such that incident light to the tubular portion 27 is guided effectively to the funnel-shaped diameter enlarged section 28. For distributing the incident light on the tubular portion 27 circumferentially uniformly, there is formed a first light deflection section on the outer circumferential surface of the tubular portion 27 for obtaining a uniformly diffusing light distribution of the light passing through the inside of the tubular portion 27. The first light deflection section comprises a plurality of prisms 33 each including prism faces 32 each having an edge 31 extending longitudinally of the tubular portion 27. These prisms 33 are formed only in a region located in close vicinity to the LED 24. Each prism 33 extends up to the funnel-shaped expanded section 28, and is adapted such that the height of the edge 31 thereof is gradually reduced. Owing to the existence of these prisms 33 the total reflection condition of the light traveling in the tubular portion 27 and the funnel-shaped expanded section 28 is broken, and the light leaks to the outside of the optical light guide member 12. The circumferential intensity distribution of the light traveling in the tubular portion 27 and the funnel-shaped expanded section 28 is thus made uniform.

The light leaking to the outside of the optical light guide member 12 is randomly reflected on an internal wall of the casing 11, and is again incident on the optical light guide member 12, and finally all of the light is emitted from the light exit surface 26 of the flat section 29.

On the internal circumferential surface of the tubular portion 27 a second light deflection section is formed. The second light deflection section in the present embodiment has an uneven surface 34 in which its thickness changes without interruption circumferentially of the tubular portion 27. The uneven surface 34 extends longitudinally of the tubular portion 27. The degree of the unevenness is set to be gradually reduced toward the side of the funnel-shaped expanded section 28. The uneven surface 34 has a uniform thickness on the other end side of the funnel-shaped expanded section 28. The uneven surface 34 is set such that the thickness of the tubular portion 27 is more increased as it goes to a region close to the LED 24, and is minimum in an intermediate region of the adjacent LED 24. With provision of such a change in the thickness of the tubular portion 27 a required numerical aperture is ensured for the light emitted from the LED 24 that is the light source, and the light can be incident into the tubular portion 27 from the light incident end surface 25. Further, unevenness of a bright distribution along the circumference of the tubular portion 27 is moderated by setting the thickness of the tubular portion 27 to be more thick as it goes to a region close to the LED 24. As a result, the circumferential intensity distribution of the light traveling in the tubular portion 27 and the funnel shape expanded section 28 is more uniformized.

Accordingly, provided that the thickness of the tubular portion 27 is successfully set larger than a light emission area of the light source, there does not happen any trouble even though the thickness of the tubular portion 27 is set uniform over the whole circumference of the tubular portion.

Figure 6:
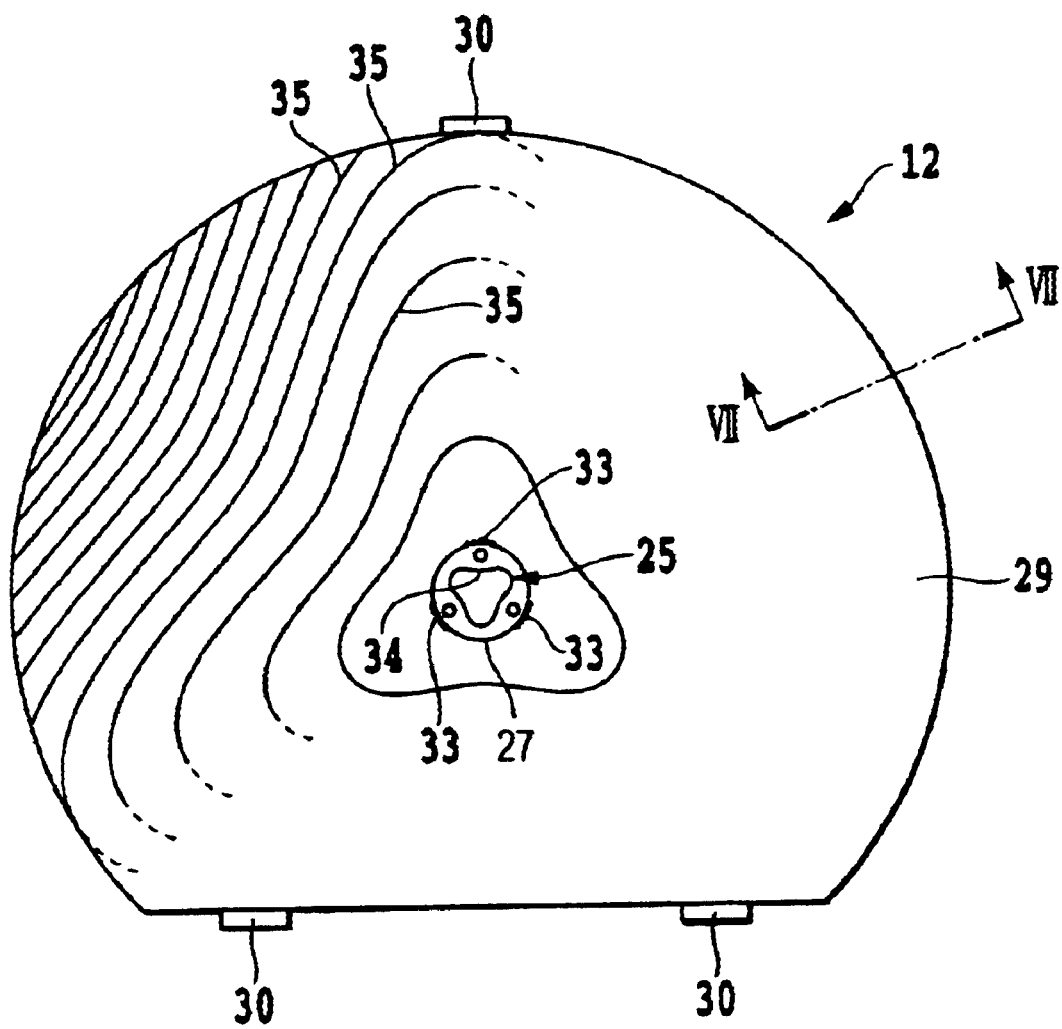
FIG. 6 is a view of the backside of the optical light guide member illustrated in FIG. 3.
Figure 7:
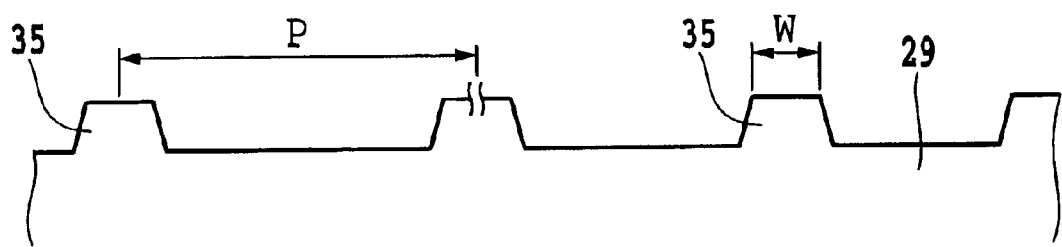
FIG. 7 is a cross sectional view of a section indicated by arrows VII-VII in FIG. 6.

Referring here to FIG. 6, the configuration of the back side of the optical light guide member 12 in the present embodiment is illustrated, and referring further to FIG. 7, a cross sectional structure of the same along a line VII to VII is illustrated in a broken state. A plurality of light deflection elements 35 are formed on the back side of the flat section 29 of the optical light guide member 12 for altering the traveling direction of the light. Each light deflection element 35 has a trapezoidal cross section with the width W of a tip end surface thereof, and the traveling direction of the light can be altered with use of a surface inclined with respect to the light exit surface 26 of the flat section 29. Each light deflection element 35 is configured into an annular structure of continuous substantially triangles that surround multiply the axis of the tubular portion 27. Noticing the one light deflection element 35, the component is disposed in a region of the light exit surface 26 where the directivity of the light and the brightness distribution are substantially the same. The light deflection elements 35 become narrower in an interval P therebetween as a distance from the axis of the tubular portion 27 radially increases. The interval P between the adjacent light deflection element 35 located on radial lines passing through the LED 24 with the axis of the tubular portion 27 taken as the center is set larger than the interval P between the light deflection elements 35 located on radial lines passing through the middle of the adjacent two LEDs 24 with the axis of the tubular portion 27 taken as the center. This ensures that the intensity of the light emitted from the light exit surface 26 can be substantially uniformized.

The configurations of the aforementioned first and second light deflection sections and light deflection elements 35 and the distributions thereof are not limited to the present embodiment, and those having arbitrary configurations may be adopted in proper so long as the intensity of the light emitted from the light exit surface 26 is substantially uniformized. For example, the cross sectional configuration of the light deflection element 35 can be successfully set to a triangle or a semicircle. Provided that the four LEDs 24 are disposed at an equal interval as the light source, it is effective that they are formed into an annular configuration of a substantially quadrangle.

In the indicating plate 14, at a central portion of which the rotary shaft through-hole 36 is formed, speed scales 37 are formed, separated away a predetermined distance from the rotary shaft through-hole 36. Visual recognition of a indicated speed is ensured by the position of an index 16 overlapped on the speed scale 37. On an outer circumferential edge of the indicating plate 14 a bracket 39, in which there is formed a stopper hole 38 capable of engagement with the stopper pin 19 provided on the flange 21 of the casing 11, is provided, protruded in a united manner. This ensures integration of the indicating plate 14 with the casing 11.

The light diffusive plate 13 in the present embodiment, at the central portion of which the rotary shaft through-hole 40 is formed, can be obtained by molding transparent acrylic resin. The backside of the light diffusive plate 13 is brought into abutment with the funnel-shaped expanded section 28 and flat section 29 of the light guide member 12 substantially in close contact. On the front side of the light diffusive plate 13 there is formed a substantially flat light diffusion surface 41, on which fine concavity and convexity portions (not shown) are randomly formed. The concavity and convexity portions serving to diffuse light may be of known configurations such as a semicircle and a prism for example. On an outer circumferential edge of the light diffusion surface 41 there is formed a rib 42 protruded from the light diffusion surface 41 into an annular configuration. The indicating plate 14 is placed on the rib 42. The diffusion state of the light emitted from the light diffusion surface 41 is more uniformized and is guided to the indicating plate 14 by forming a gap between the light diffusion surface 41 of the light diffusive plate 13 and the indicating plate 14.

It is possible to form the optical light guide member 12 and the light diffusive plate 13 as an integral structure. It is also possible to neglect the light diffusive plate 13. When the light diffusive plate 13 is neglected, it is effective to randomly form at need a fine concavity and convexity portions for diffusion of light on the back of the light exit surface 26 of the optical light guide member 12 and on the back of the indicating plate 14.

It is possible to emit light with an arbitrary hue from the indicating plate 14 irrespective of the characteristics of the light from the LED 24 that is the light source with respect to the wavelengths by coloring the optical light guide member 12 and the light diffusive plate 13 or the indicating plate 14 itself to desired tones of color.

To a base end of the rotary shaft 15 there is coupled rotary shaft drive means (not shown) through a flexible cable (not shown). With use of the rotary shaft drive means the number of revolutions corresponding to an indicated speed is provided to the rotary shaft 15.

On the outer circumferential edge of the cover 17 there is formed integrally a stopper pawl 43 that is capable of engaging with the stopper hole 20 formed in the flange section 21 of the casing 11. The casing 11 is kept closed with the cover 17.

The light from the LED 24 is incident on the tubular portion 27 of the optical light guide member 12 from the light incident end surface 25, and repeats internal total reflection at an angle dependent on the refractive index of the optical light guide member 12, and further travels from the funnel-shaped expanded section 28 to the flat section 29 in a diffused state. Partial light broken in a total reflection condition in the optical light guide member 12 therefore leaks out to the outside of the optical light guide member 12, and is reflected on an inner wall of the casing 11 and is incident on the optical light guide member 112, and finally exits from the light exit surface 26.

In the present embodiment, owing to the existence of the light incident end surface 25 made concave, of the prism 33 formed on the outer circumference of the tubular portion 27, of the uneven surface 34 formed on the inner circumference of the tubular portion 27, and of the light deflection element 35 formed on the back of the flat section 29, the distribution of the light emitted from the light exit surface 26 is substantially uniformized to realize the transmission illumination without an uneven amount of light over the entire area of the light exit surface 26.

Figure 8:
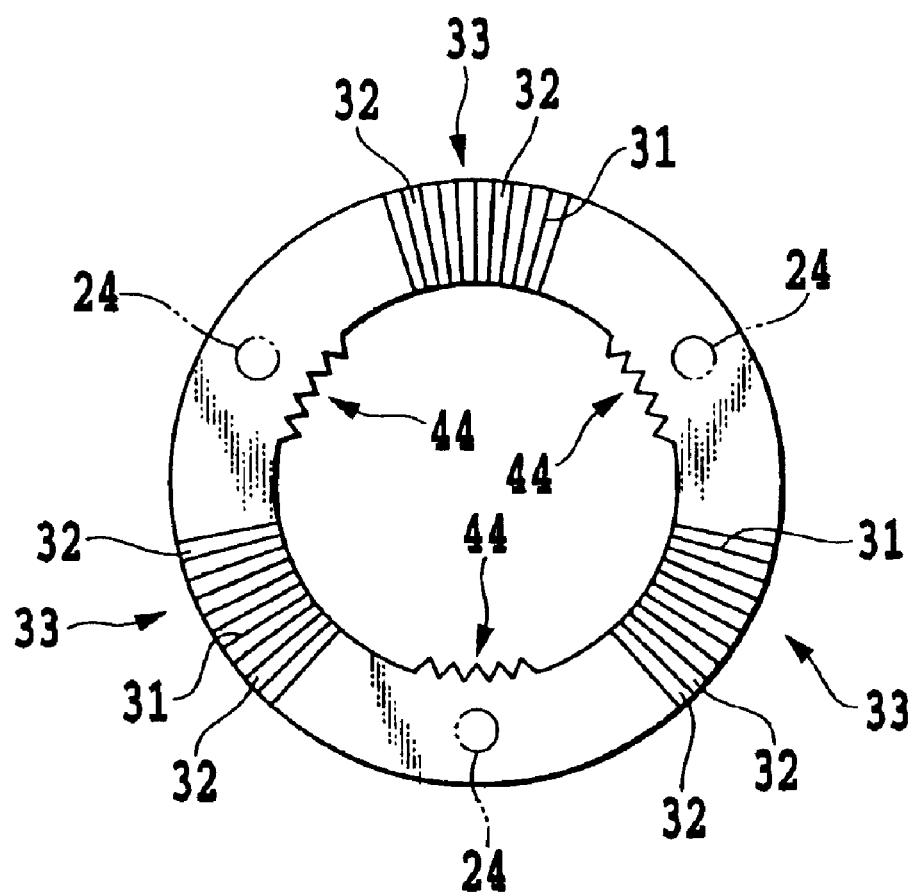
FIG. 8 is an enlarged front view of the light incident end surface in another embodiment of the optical light guide member.

Although in the aforementioned embodiment, the first light deflection section is formed on the outer circumference of the tubular portion 27, it is instead possible to form it on the light incident end surface 25. Referring to FIG. 8, there is illustrated, extracted and enlarged the light incident end surface 25 as another embodiment of the present invention, in which only the identical symbols will be applied to components having the identical functions in the aforementioned embodiment, and overlapped description will be omitted. As the first light deflection section of the present invention there is formed a prism 33 having an edge 31 extending radially from the center of the light incident end surface 25 on the same 25 of the tubular portion 27. The prisms 33 in the present embodiment are not formed over the entire area of the light incident end surface 25, but they are partially disposed only in a region separated most far away from the LED 24. More specifically, the light beams from the LEDs 24 are incident on the tubular portion 27 from these prisms 33. In the present embodiment, as the second light deflection section formed on the inner circumferential surface of the tubular portion 27, there are formed prisms 44 with the same construction as that of the aforementioned prisms 33 only in regions close to the LEDs 24. Therefore, the intensity distribution of the light traveling in the tubular portion 27 circumferentially of the same 27 can be uniformized as in the foregoing embodiment.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical light guide member comprising:
   a tubular portion in which an annular light incident end surface for entering light is formed on a side of a one end thereof, the tubular portion having an inner circumumferential surface that allows a shaft to penetrate the tubular portion of the optical light guide member;
   a funnel-shaped expanded section having a one-end side thereof continuously extending to the other end of said tubular portion;
   a flat section which includes on a front side thereof a light exit surface extending along a flat plane intersecting an axis of said tubular portion for emitting light, and which extends continuously to the one end side of said funnel-shaped expanded section; and a plurality of light deflection elements formed at least on the backside of said flat section each for altering the traveling direction of the light.

2. An optical light guide member as claimed in claim 1, wherein said light incident end surface is constructed with part of a circular cone or a spherical surface having a center side thereof being concave.

3. An optical light guide member as claimed in claim 1, further comprising a first light deflection section formed on at least one of an outer circumferential surface of said tubular portion and said light incident end surface.

4. An optical light guide member as claimed in claim 3, wherein said first light deflection section formed on the outer circumferential surface of said tubular portion includes plural pairs of prism faces each having an edge extending longitudinally of said tubular portion.

5. An optical light guide member as claimed in claim 3, wherein said first light deflection section formed on said incident end surface includes plural pairs of prism faces each having an edge radially extending from a center of said light incident end surface.

6. An optical light guide member as claimed in claim 1, wherein said light deflection elements are of a continuous annular configuration respectively and surround multiply the axis of said tubular portion, and an interval between said light deflection elements is more narrowed as a distance from the axis of said tubular portion radially increases.

7. An optical light guide member as claimed in claim 1, further comprising a second light deflection section formed on the inner circumferential surface of said tubular portion.

8. An optical light guide member as claimed in claim 7, wherein said second light deflection section formed on the inner circumference surface of said tubular portion has an uneven surface, the thickness of which continuously changes circumferentially of said tubular portion.

9. An optical light guide member as claimed in claim 1, wherein said flat section is gradually reduced in its thickness toward the side of an outer circumferential end thereof.

10. An illumination unit comprising:

the optical light guide member as claimed in claim 1;

a light source disposed oppositely to the light incident end surface of the tubular portion of said optical light guide member for emitting a light as illumination light that is incident on said optical light guide member from said light incident end surface; and a light reflection member for covering said optical light guide member except said light incident end surface and the light exit surface so as to reflect light leaking out of said optical light guide member except said light incident end surface and the light exit surface.

11. An illumination unit as claimed in claim 10, further comprising a light diffusion member which is disposed oppositely to said light exit surface of said optical light guide member for diffusing the light emitted from said light exit surface.

12. An illumination unit as claimed in claim 11, wherein said light diffusion member is colored.

13. An illumination unit as claimed in claim 10, wherein said light source includes a plurality of LEDs disposed at an equal interval.

14. An instrument comprising:

an illumination unit as claimed in claim 10;

a rotary shaft which penetrates the tubular portion of said optical light guide member and to which the number of revolutions is provided from a base end in response to an input; and an index mounted on a tip end of the rotary shaft.

15. An instrument as claimed in claim 14, wherein further comprising a casing for accommodating said illumination unit.

16. An instrument as claimed in claim 15, wherein said casing is the light reflection member of said illumination unit.

17. An instrument as claimed in claim 14, wherein said optical light guide member is a light diffusion member of said illumination unit.

18. An instrument as claimed in claim 14, wherein the illumination unit further comprises a light diffusion member which is disposed oppositelt to said light exit surface of said optical light guide member for diffusing the light emitted from said light exit surface.

19. An instrument as claimed in claim 18, wherein said light diffusion member is colored.

* * * * *

UNITED STATES PATENT AND TRADEMARK OFFICE
CERTIFICATE OF CORRECTION

PATENT NO. : 6,848,799 B2
DATED : February 1, 2005
INVENTOR(S) : Kalil Kalantar

It is certified that error appears in the above-identified patent and that said Letters Patent is hereby corrected as shown below:

Column 1,
Line 65, change "Section" to -- section --.

Column 4,
Line 40, after "guide member" insert -- 12 --.
Line 48, remove bold facing from the numeral "3".
Line 52, remove bold facing from the numeral "6".
Line 57, remove bold facing from the numeral "3".

Column 8,
Line 8, change "112" to -- 12 --.
Line 32, remove "on the same 25".

Column 10,
Line 28, before "further" remove "wherein".
Line 39, change "oppositelt" to -- oppositely --.

Signed and Sealed this

Sixteenth Day of August, 2005

JON W. DUDAS
*Director of the United States Patent and Trademark Office*